(12) United States Patent
Mak et al.

(10) Patent No.: US 10,225,475 B2
(45) Date of Patent: Mar. 5, 2019

(54) MAGNETIC INTERFERENCE-RESISTANT OPTICAL IMAGE STABILIZATION VOICE COIL MOTOR AND ITS METHOD OF MANUFACTURING

(71) Applicant: AP PHOTONICES (SHENZHEN) LIMITED, Shenzhen, Guangdong (CN)

(72) Inventors: Lin Chi Mak, Guangdong (CN); Wai Kwong Lo, Guangdong (CN); Yu Hui Peng, Guangdong (CN)

(73) Assignee: AP PHOTONICES (SHENZHEN) LIMITED, Shenzhen (CN)

( * ) Notice: Subject to any disclaimer, the term of this patent is extended or adjusted under 35 U.S.C. 154(b) by 0 days.

(21) Appl. No.: 15/853,997

(22) Filed: Dec. 26, 2017

(65) Prior Publication Data

US 2018/0124296 A1   May 3, 2018

Related U.S. Application Data

(63) Continuation of application No. PCT/CN2015/082447, filed on Jun. 26, 2015.

(51) Int. Cl.
| | |
|---|---|
| *H04N 5/232* | (2006.01) |
| *G03B 5/00* | (2006.01) |
| *G03B 13/36* | (2006.01) |
| *H02K 33/18* | (2006.01) |
| *H04N 5/225* | (2006.01) |
| *G02B 27/64* | (2006.01) |

(52) U.S. Cl.
CPC ......... *H04N 5/2328* (2013.01); *G02B 27/646* (2013.01); *G03B 5/00* (2013.01); *G03B 13/36* (2013.01); *H02K 33/18* (2013.01); *H04N 5/2252* (2013.01); *H04N 5/2253* (2013.01); *H04N 5/23287* (2013.01)

(58) Field of Classification Search
CPC ............. H04N 5/2328; H04N 5/23287; H04N 5/2252; H04N 5/2253; G02B 27/646; G03B 5/00; G03B 13/36; H02K 33/18
See application file for complete search history.

(56) References Cited

U.S. PATENT DOCUMENTS

| | | | |
|---|---|---|---|
| 2014/0327965 A1* | 11/2014 | Chen .................... | G02B 27/646 359/557 |
| 2014/0368914 A1* | 12/2014 | Hu ....................... | G02B 27/646 359/557 |

FOREIGN PATENT DOCUMENTS

| | | |
|---|---|---|
| CN | 103454750 A | 12/2013 |
| CN | 104317032 A | 1/2015 |

* cited by examiner

*Primary Examiner* — Yogesh K Aggarwal

(57) ABSTRACT

The present invention provides a magnetic interference-resistant optical image stabilization voice coil motor and a method of manufacturing same. The motor includes a housing, multiple pairs of magnets, a lens carrier, a conductive spring plate and multiple coils. The magnet is fixed on an inner wall of the housing, the coil is mounted on an outer wall of the lens carrier, and the coil is disposed opposite to the magnet. The conductive spring plate is mechanically fixedly connected to the bottom of the lens carrier and the housing, the conductive spring plate is provided with at least three conductive paths, each of the conductive paths corresponds to one coil and has an input end and a common end adjacent to and separated from each other, a first wire end and a second wire end of each of the coils are respectively connected to the corresponding input end and common end.

10 Claims, 6 Drawing Sheets

MAGNETIC INTERFERENCE-RESISTANT OPTICAL IMAGE STABILIZATION VOICE COIL MOTOR AND ITS METHOD OF MANUFACTURING

CROSS-REFERENCE TO RELATED APPLICATIONS

The present application is a Continuation Application of PCT application No. PCT/CN2015/082447 filed on Jun. 26, 2015, the entire contents of which are hereby incorporated by reference.

TECHNICAL FIELD

The present invention relates to the technical field of optical image stabilization apparatus, and particularly to a magnetic interference-resistant optical image stabilization voice coil motor and its method of manufacturing.

BACKGROUND

At present, the micro optical image stabilization voice coil motor technology has been widely applied to high-end mobile phones, and can effectively reduce the probability of blurred images during photographing in a low-light environment, and reduce the disturbing jitter in the image. However, compared with ordinary autofocus motors, optical image stabilization voice coil motors have a complex design and low production yield and efficiency, and require high costs. Therefore, this technology has not been widely applied to middle-end and low-end mobile phones, and most mobile phone users have not enjoyed the benefits of this technology.

Currently, micro optical image stabilization voice coil motors may be classified into the following three types, with their names and principles being as follows:

1. camera-module-axis-shifting-type: the voice coil motor controls the lens and the image sensor to rotate together.
2. lens-translation-type: the voice coil motor controls the lens to translate, with the image sensor being kept still.
3. lens-axis-shifting-type: the voice coil motor controls the lens to rotate, with the image sensor being kept still.

The above three types of motors have their respective advantages, but the lens-axis-shifting-type motor has the simplest structure.

The structure of a typical lens-axis-shifting-type optical image stabilization voice coil motor includes a housing, a base, at least one group of elastic material, at least three groups of magnets, at least three independent coils, and a lens carrier. The housing and the base form a fixed structure. The elastic material connects a movable structure including the lens carrier to the fixed structure to form a spring oscillator system having multiple degrees of freedom, so that the lens can rotate in two directions (for the purpose of optical image stabilization), and displace along the optical axis (for the purpose of auto-focusing). The coils and the magnets may be located respectively in the fixed and movable structures, or respectively in the movable and fixed structures.

Lens-axis-shifting-type optical image stabilization voice coil motors may be classified into three types according to the compositions of the lens carrier and the elastic material.

The first type of lens-axis-shifting-type optical image stabilization voice coil motor includes at least two groups of conductive elastic materials. The conductive elastic materials of this type of motor needs to be elastic and conductive (for example, made of a metal), and can allow a current to flow through during normal operation (for example, conduct electricity to the coils). The two groups of conductive elastic materials connects the upper and lower parts of the lens carrier to the fixed structure. Because such a structure needs to mechanically connect the lens carrier and the conductive elastic materials located above and below the carrier (for example, using an adhesive), and electrically connect the coils on the lens carrier and two groups of springs (for example, using a solder), the production difficulty is increased. In addition, because the two ends of the coil is respectively connected to the upper conductive elastic material which is used as a common end and the lower conductive elastic material which is used as a current input end, the entire loop circuit is long, and easily causes electromagnetic interference to nearby elements (especially the image sensor). Moreover, because the axis-shifting-type motor needs to allow for easy axis-shifting rotation, the spring coefficient of the upper group of conductive elastic material needs to be lower than that of the lower group of elastic material, resulting in low resistance to dropping, and reducing the reliability of this type of motor in the drop test.

The second type of lens-axis-shifting-type optical image stabilization voice coil motor only includes one group of conductive elastic material to connect the lens carrier and the fixed structure. The lens carrier may include three coils. One of the coils controls the lens to move along the optical axis to achieve auto-focusing, and the other two coils control the lens to rotate in two directions for axis shifting, to achieve optical image stabilization. However, the average position of the focusing coil and the average position of the axis-shifting coil are distant from the average position of the magnet. When the motor stroke changes, the density of the magnetic field passing through the coil is likely to change nonlinearly, leading to nonlinearity of the properties of the motor. To achieve an ideal focusing and image stabilization effect, the type of motor requires a complex control and adjustment system, leading to an increase in the costs of the entire image stabilization system and adjustment system.

The third type of lens-axis-shifting-type optical image stabilization voice coil motor does not include a conductive elastic material, and includes only one or two elastic materials, to connect the movable structure including the lens carrier and the magnets. Because the movable structure of this type of motor does not require electrical connection, this type of motor is more suitable for mass production than the first and second types of motors. In addition, the average positions of the focusing and axis-shifting coil of the first and third types of motors can be very close to the average position of the magnet, the nonlinearity problem of the second type of motor can be avoided. However, the magnets of the third type of motor, which are located in the movable structure, may experience interference from an approaching external strong magnetic field.

SUMMARY

Technical Problem

The technical problem to be solved by the present invention is to provide a magnetic interference-resistant optical image stabilization voice coil motor with improved production efficiency, good linear properties but not easily affected by an external magnetic field, and a method of manufacturing the same.

The present invention is implemented as follows: A magnetic interference-resistant optical image stabilization voice coil motor, including a housing, and a plurality of magnets, a lens carrier, a conductive spring plate and coils arranged inside the housing, wherein the plurality of magnets are divided into pairs, and two magnets of each pair have opposite magnetic field directions and are arranged side by side vertically; the coils are formed by winding a conductive wire, and each of the coils has a first wire end and a second wire end, wherein the magnetic interference-resistant optical image stabilization voice coil motor includes one conductive spring plate, at least three said pairs of magnets and at least three coils, wherein the at least three pairs of magnets are all fixed on an inner wall of the housing, the at least three coils are all mounted on an outer wall of the lens carrier, and each of the coils is disposed opposite to one pair of magnets; and the conductive spring plate is mechanically fixedly connected to the bottom of the lens carrier and the housing or the bottom of a lower row of magnets, the conductive spring plate is provided with at least three conductive paths, each of the conductive paths corresponds to one coil and has an input end and a common end adjacent to and separated from each other, and the first wire end and the second wire end of each of the coils are respectively connected to the input end and the common end of the corresponding conductive path.

Preferably, the input ends of the conductive paths are not connected to each other, and the common ends are not connected to each other or at least two of the common ends are electrically connected to each other.

Preferably, the magnetic interference-resistant optical image stabilization voice coil motor further includes a base, the base is provided thereon with a conductive portion for electrically connecting to the outside, the conductive portion is exposed out of a surface of the base, and the coil is electrically connected to the conductive portion.

Preferably, the housing is covered on the base, the base is provided thereon with an engaging column extending upwards, a slot is formed on the outer wall of the lens carrier, a through hole is formed on a periphery of the conductive spring plate, and the engaging column is engaged in the slot through the through hole.

Preferably, the magnetic interference-resistant optical image stabilization voice coil motor further includes a press ring, the press ring is sandwiched between the conductive spring plate and the base, and a top surface of the press ring is fixedly connected to the conductive spring plate.

Preferably, a boss is provided on the outer wall of the lens carrier, and the coil is wound around a periphery of the boss.

Preferably, the lens carrier is further provided with winding columns extending from the bottom thereof, the first and second wire ends of the coil are wound on two different winding columns, and the conductive spring plate is provided with yielding holes at positions corresponding to the winding columns.

Preferably, the housing has a rectangular cross-section, the magnetic interference-resistant optical image stabilization voice coil motor includes four pairs of magnets and four coils, and the four pairs of magnets are respectively located at four corners inside the housing.

Preferably, the optical image stabilization voice coil motor further includes a fixing spring plate mechanically connected to the top of the lens carrier and the housing.

The present invention further provides a method of manufacturing a magnetic interference-resistant optical image stabilization voice coil motor, including the following steps:

A. winding the conductive wire into a coil by using an automatic coil winding machine, and mounting the coil onto the lens carrier;

B. placing the conductive spring plate below the lens carrier, and mechanically connecting the conductive spring plate to the lens carrier;

C. electrically connecting the input ends and the common ends of the conductive paths on the conductive spring plate to the first and second wire ends of the coils respectively;

D. fixing magnets to the inner wall of the housing, and disposing the lens carrier inside the housing in such a manner that each of the coils is opposite to one pair of magnets; and E. mechanically connecting the magnets and the conductive spring plate.

Compared with the prior art, the present invention has the following beneficial effects: The magnetic interference-resistant optical image stabilization voice coil motor of the present invention includes at least three pairs of magnets and at least three coils, and can support both the three-dimensional auto-focusing and optical image stabilization functions. The present invention includes only one conductive spring plate, and no additional conductive spring plate needs to be disposed at the top of the lens carrier, so that the step of electrically connecting the additional conductive spring plate to the coil is saved, thereby improving the production efficiency. Because each conductive path corresponds to one coil and has an input end and a common end adjacent to and separated from each other, the second wire end of the coil can be as close as possible to the common end to be electrically connected thereto, and therefore can be electrically connected to the common end without the need to wind the coil for a long distance, thereby simplifying the production process, shortening the circuit length, lowering the resistance of the coil, and reducing the probability of poor contact. In addition, because the input end and the common end of each conductive path are adjacent to each other, the circuit only cause a little electromagnetic interference to nearby elements. Moreover, because the average position of the coil during movement is close to the average position of the magnet, the focusing linearity of the voice coil motor as well as the accuracy and speed of auto-focusing are improved. Furthermore, because the magnets are mounted on the inner wall of the housing, that is, located in a fixed structure, the voice coil motor is not easily affected by an external magnetic field during operation.

DETAILED DESCRIPTION

To make the technical problem to be solved by the present invention, the technical solutions and the beneficial effects more comprehensible, the present invention is described in further detail with reference to the accompanying drawings and embodiments. It should be understood that the specific embodiments described herein are merely for the purpose of illustrating the present invention, and are not intended to limit the present invention.

Figure 1:
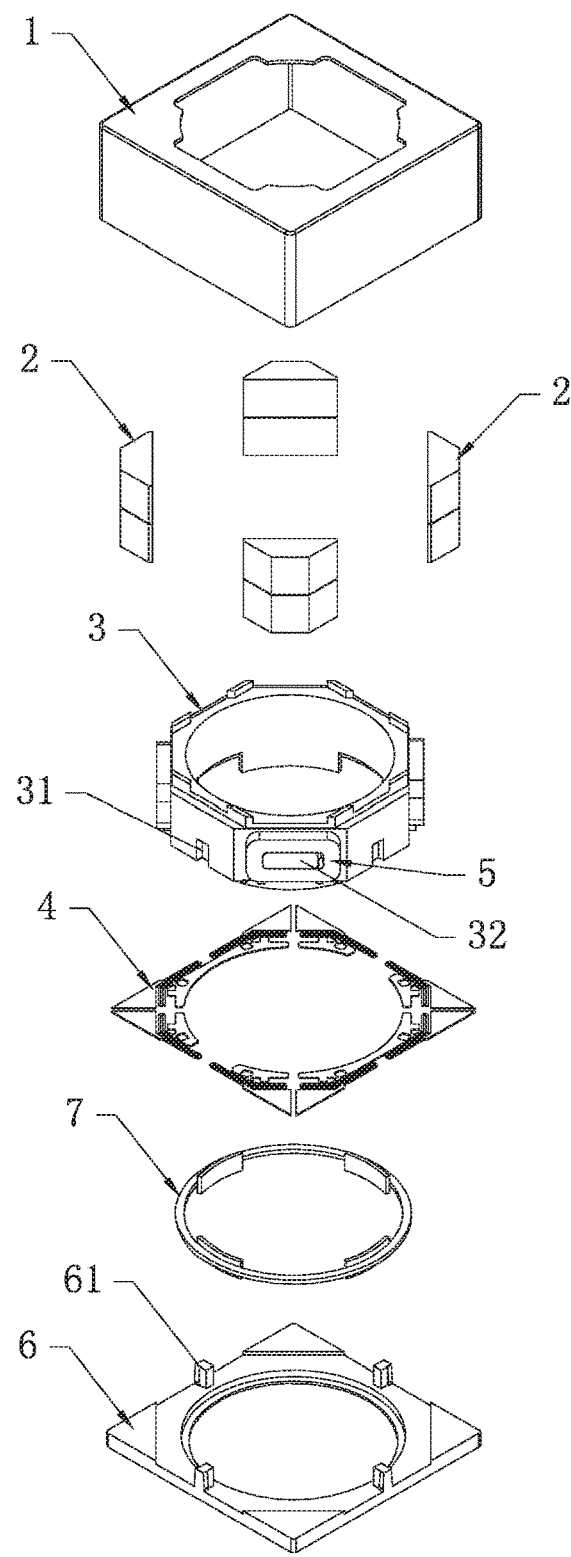
FIG. 1 is an exploded schematic structural view of a magnetic interference-resistant optical image stabilization voice coil motor according to a first embodiment of the present invention.
Figure 2:
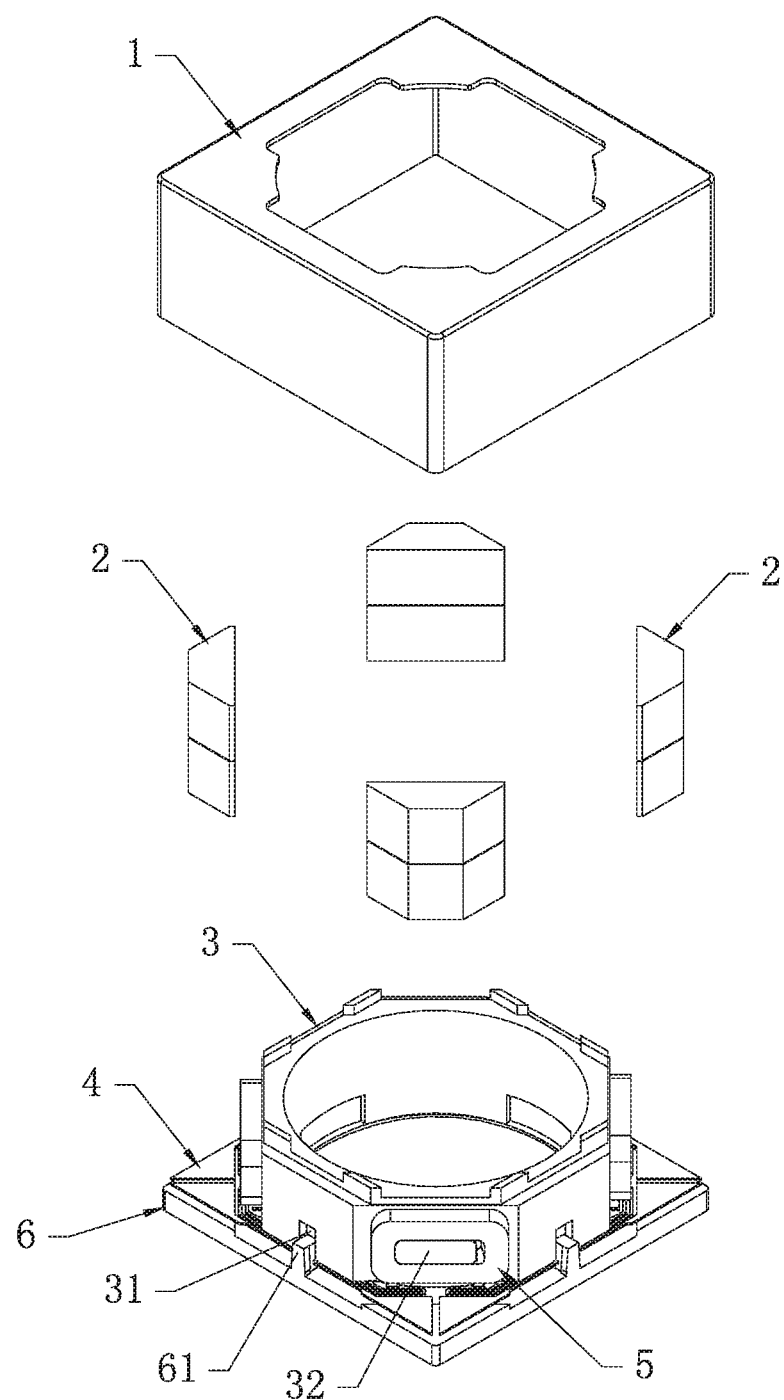
FIG. 2 is another exploded schematic structural view of the embodiment shown in FIG. 1.
Figure 3:
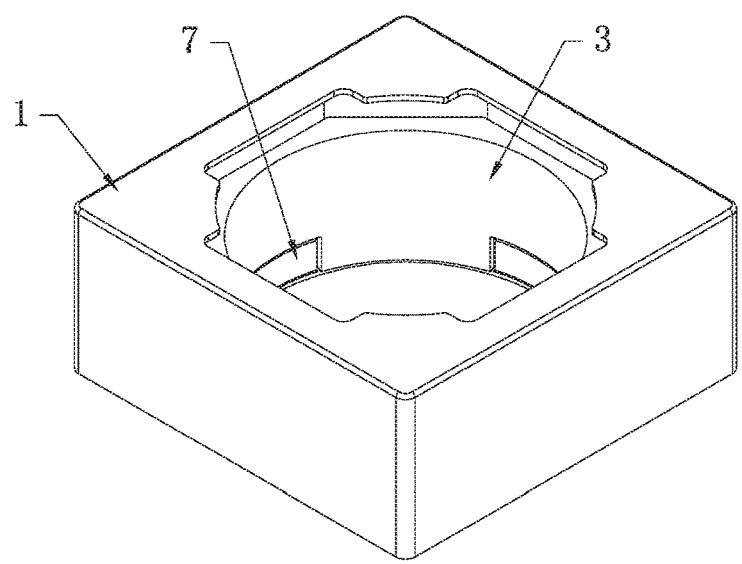
FIG. 3 is a three-dimensional schematic structural view of the embodiment shown in FIG. 1.
Figure 4:
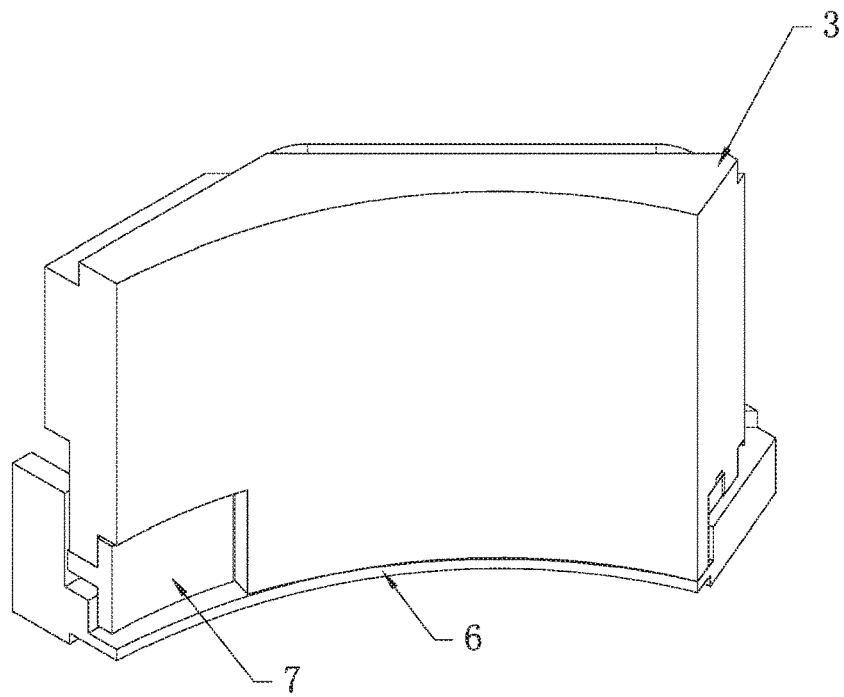
FIG. 4 is a partial three-dimensional schematic structural view of the embodiment shown in FIG. 1.

As shown in FIG. 1 to FIG. 3, a first embodiment of the present invention provides a magnetic interference-resistant optical image stabilization voice coil motor, including a housing 1, and at least three pairs of magnets 2, a lens carrier 3, a conductive spring plate 4 and at least three coils 5 disposed inside the housing 1. Every two of the magnets 2 form a pair, and the two magnets 2 of each pair are disposed side by side vertically and have opposite magnetic field directions. The magnets 2 are all fixed on an inner wall of the housing 1, the coils 5 are all mounted on an outer wall of the lens carrier 3, and each of the coils 5 is disposed opposite to one pair of magnets 2. The conductive spring plate 4 is mechanically fixedly connected to the bottom of the lens carrier 3 and the housing 1 or the bottom of a lower row of magnets 2. The coils 5 are formed by winding a conductive wire, and each of the coils 5 has a first wire end and a second wire end (not shown). The conductive spring plate 4 is provided with at least three conductive paths 41, each of the conductive paths 41 corresponds to one coil 5 and has an input end 411 and a common end 412 adjacent to and separated from each other, and the first wire end and the second wire end (not shown) of each of the coils 5 are respectively connected to the input end 411 and the common end 412 of the corresponding conductive path 41.

The magnetic interference-resistant optical image stabilization voice coil motor of this embodiment includes at least three pairs of magnets 2 and at least three coils 5, and can support both the three-dimensional auto-focusing and optical image stabilization functions. For example, when the number of the coils 5 and the number of the pairs of magnets 2 are both three, assuming that the lens center is the true center, when viewed upward from the lens, the three pairs of magnets 2 and the three coils 5 are respectively distributed at 0-degree, 120-degree, and 240-degree positions. When the three coils 5 receive upward forces that are equal, the lens displaces along the optical axis. When the lens needs to be tilted toward the 0-degree position, the force applied on the coil at the 0-degree position is decreased, and the other two forces are increased. When the lens needs to be tilted toward the 60-degree position, the force applied on the coil at the 240-degree position is increased, and the other two forces are decreased.

Specifically, in this embodiment, the magnetic interference-resistant optical image stabilization voice coil motor includes one conductive spring plate 4, four pairs of magnets 2 and four coils 5. The four coils 5 are evenly distributed around an outer periphery of the lens carrier 3, that is, every two neighboring coils form an angle of 90 degrees. The housing 1 has a rectangular cross-section, and the four pairs of magnets 2 are respectively located at four corners inside the housing 1, so that the limited space inside the housing 1 can be used more effectively. The conductive spring plate 4 is provided with four conductive paths 41. Definitely, in actual applications, the four pairs of magnets 2 are not limited to being located at the four corners inside the housing 1, but may also be respectively located on four sides inside the housing, and correspondingly, each of the coils 5 is disposed opposite to one pair of magnets 2.

Because there is only one conductive spring plate 4, and no additional conductive spring plate 4 needs to be disposed at the top of the lens carrier 3, so that the steps of mechanically connecting the top of the lens carrier 3 to the additional conductive spring plate and electrically connecting the additional conductive spring plate 4 to the coil 5 are saved, thereby improving the production efficiency. Because each conductive path 41 corresponds to one coil 5 and has an input end 411 and a common end 412 adjacent to and separated from each other, the second wire end of the coil 5 can be as close as possible to the common end 412 to be electrically connected thereto, and therefore can be electrically connected to the common end 412 without the need to wind the coil 5 for a long distance, thereby simplifying the production process, shortening the circuit length, lowering the resistance of the coil 5, and reducing the probability of poor contact. In addition, because the input end and the common end of each conductive path are adjacent to each other, the circuit only cause a little electromagnetic interference to nearby elements (for example, the image sensor). Moreover, because the average position of the coil 5 during movement is close to the average position of the magnet 2, the focusing linearity of the voice coil motor as well as the accuracy and speed of auto-focusing are improved. Furthermore, because the magnets 2 are mounted on the inner wall of the housing 1, that is, located in a fixed structure, the voice coil motor is not easily affected by an external magnetic field during operation.

The optical image stabilization voice coil motor further includes a base 6 and a press ring 7, the housing 1 is covered on the base 6, the base 6 is provided thereon with a conductive portion (not shown) for electrically connecting to the outside, the conductive portion is exposed out of a surface of the base 6, and the coil 5 is electrically connected to the conductive portion. The base 6 is provided thereon with an engaging column 61 extending upwards, a slot 31 is formed on the outer wall of the lens carrier 3, a through hole 42 is formed on a periphery of the conductive spring plate 4, and the engaging column 61 is engaged in the slot 31 through the through hole 42. In this embodiment, the conductive spring plate 4 is mechanically connected to both the top surface of the base 6 and the bottom of the lower row of magnets 2.

The press ring 7 is sandwiched between the conductive spring plate 4 and the base 6, and a top surface of the press ring 7 is fixedly connected to the conductive spring plate 4. When the motor is installed in a camera module, dust may contaminate an optical filer or image sensor below the lens carrier 3, leading to a rejected camera module. In this embodiment, by providing the press ring 7, the conductive spring plate 4 and the press ring 7 can be maintained in close contact with the base 6, so as to prevent the optical filer or image sensor from being contaminated by dust.

A boss 32 is provided on the outer wall of the lens carrier 3, and the coil 5 is wound around a periphery of the boss 32.

Figure 5:
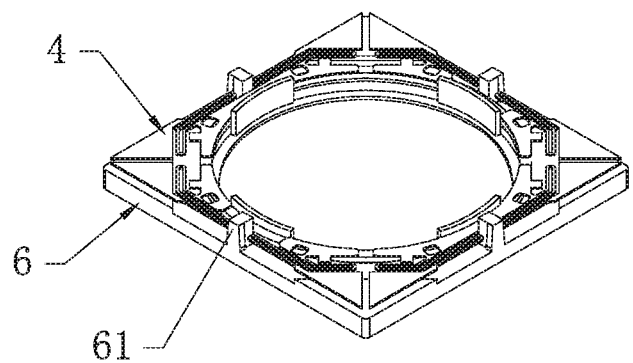
FIG. 5 is a three-dimensional schematic structural view illustrating a conductive spring plate and a press ring that are mounted on a base in the embodiment shown in FIG. 1.
Figure 6:
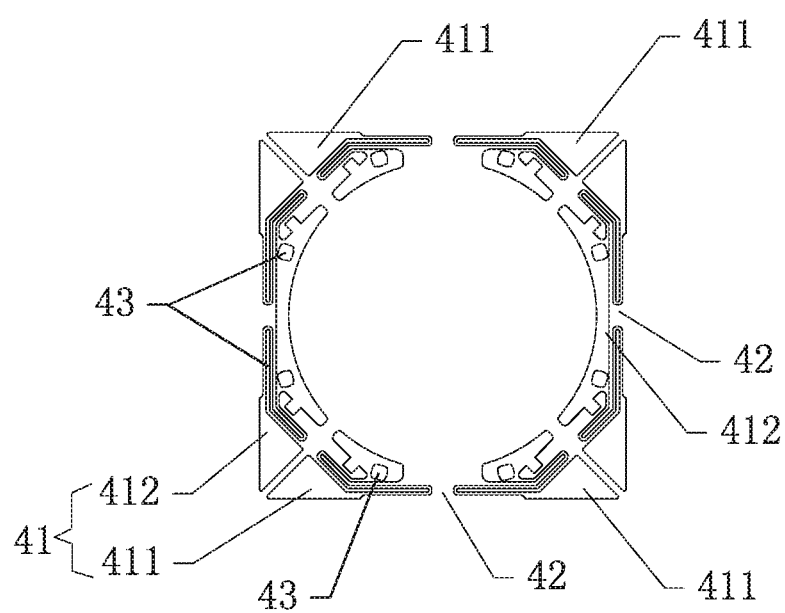
FIG. 6 is a schematic top view of a first type of conductive spring plate according to the embodiment shown in FIG. 1.

Referring to FIG. 5 and FIG. 6, the lens carrier 3 is further provided with winding columns 32 extending from the bottom thereof, the first and second wire ends of the coil 5 are wound on two different winding columns 32, and the conductive spring plate 4 is provided with yielding holes 43 at positions corresponding to the winding columns 32. In this way, the winding columns 32 can pass through the yielding holes 42 on the conductive spring plate 4, and the yielding holes 43 facilitate the electrical connection (for example, soldering) of the conductive spring plate 4 and the coil 5.

Figure 7:
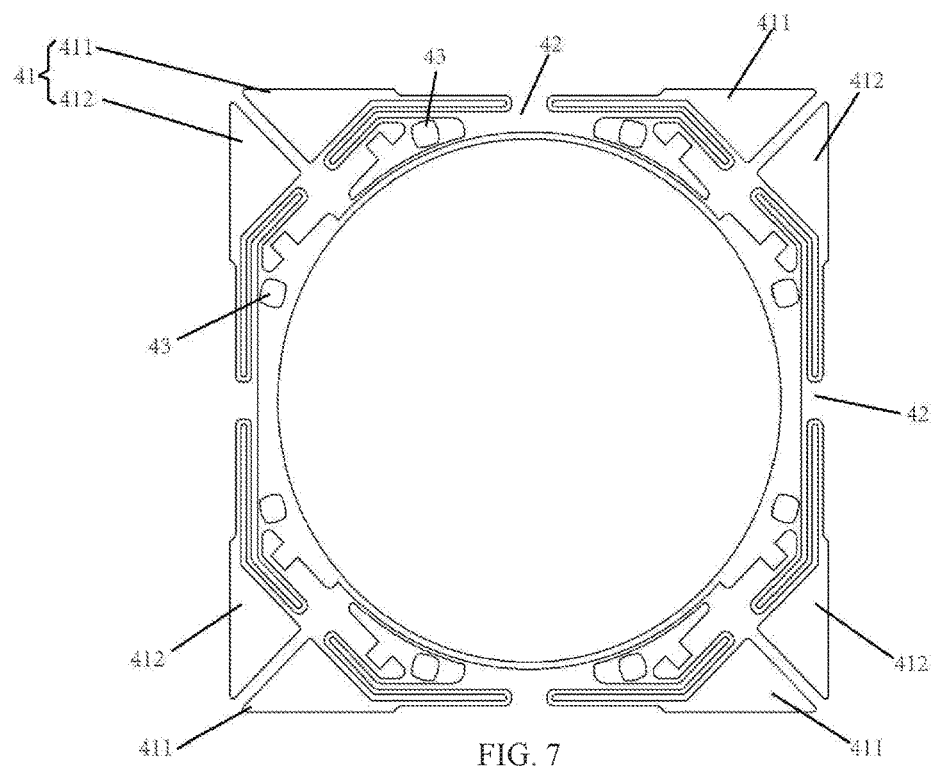
FIG. 7 is a schematic top view of a second type of conductive spring plate according to the embodiment shown in FIG. 1.
Figure 8:
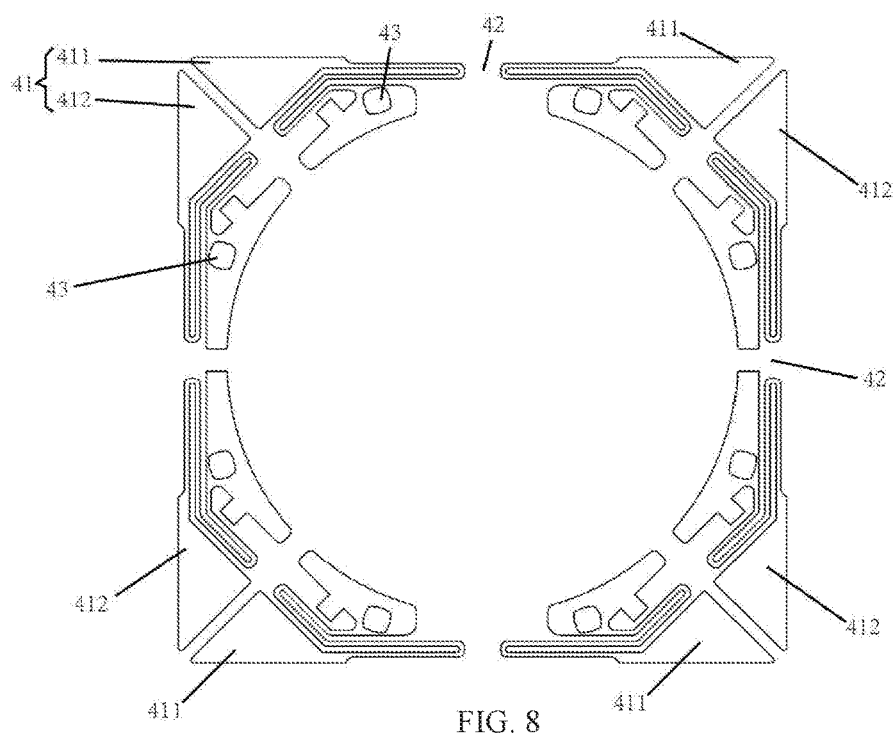
FIG. 8 is a schematic top view of a third type of conductive spring plate according to the embodiment shown in FIG. 1.

One of the two ends of the conductive path 41 is the input end 411, and the other end is the common end 412. The input ends 411 of the conductive paths 41 are not connected to each other, and the common ends 412 are not connected to each other or at least two of the common ends 412 are electrically connected to each other. In actual applications, the common ends 412 may be connected in various manners. As shown in FIG. 6, two common ends 412 form a group, and are electrically connected to each other. As shown in FIG. 7, the four common ends 412 are all electrically connected together. As shown in FIG. 8, the four common ends 412 are separated from each other. Power needs to be supplied to the coils 5 in order to make the coils move under a force. The common ends 412 may be electrically connected to an external power supply, or may be grounded. Correspondingly, the ends of the coils 5 may be grounded, or may be electrically connected to an external power supply.

The magnetic interference-resistant optical image stabilization voice coil motor of this embodiment are manufactured by the following steps:

A. winding the conductive wire into a coil 5 by using an automatic coil winding machine, and mounting the coil 5 onto the lens carrier 3;

B. placing the conductive spring plate 4 below the lens carrier 3, then passing the winding columns 32 at the bottom of the lens carrier 3 through the yielding holes 42 of the conductive spring plate 4, and mechanically connecting the conductive spring plate 4 to the lens carrier 3;

C. electrically connecting the input ends 411 and the common ends 412 of the conductive paths 41 on the conductive spring plate 4 to the first and second wire ends of the coils 5 respectively;

D. placing the press ring 7 below the conductive spring plate 4, and mechanically connecting the press ring 7 and the conductive spring plate 4; and E. placing the conductive spring plate 4 above the base 6, then mechanically connecting the conductive spring plate 4 and the base 6, and electrically connecting the conductive spring plate 4 and the conductive portion on the base 6;

F. fixing the magnets 2 to the inner wall of the housing 1, and disposing the lens carrier 3 inside the housing 1 in such a manner that each of the coils 5 is opposite to one pair of magnets 2; and G. mechanically connecting the conductive spring plate 4 and the bottom of the lower row of magnets 2.

Figure 9:
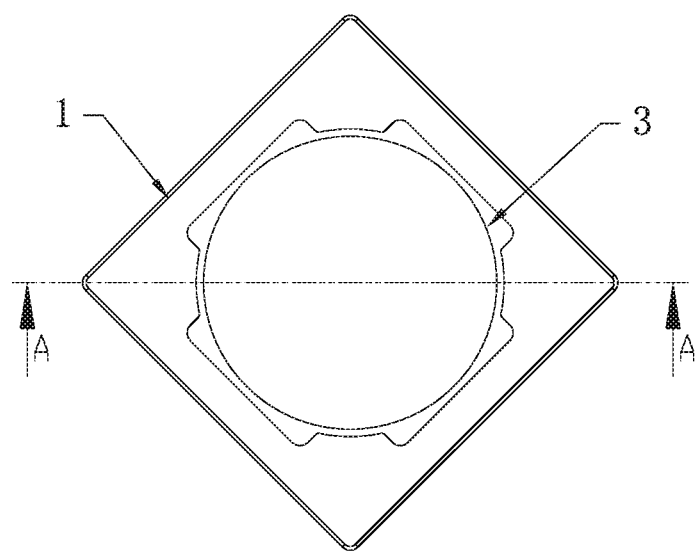
FIG. 9 is a schematic top view of a magnetic interference-resistant optical image stabilization voice coil motor according to a second embodiment of the present invention.
Figure 10:
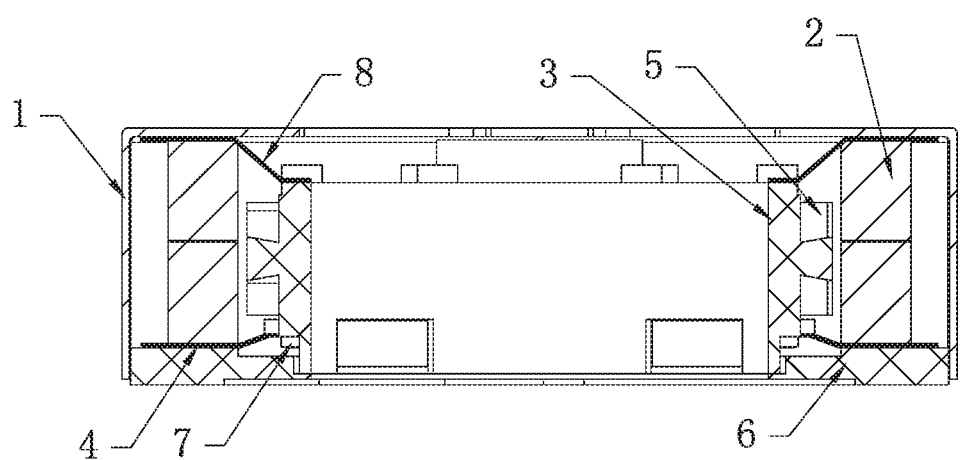
FIG. 10 is a schematic cross-sectional view of the magnetic interference-resistant optical image stabilization voice coil motor according to the second embodiment of the present invention taken along a direction A-A in FIG. 9.

Referring to FIG. 9 and FIG. 10, a second embodiment of the present invention provides a magnetic interference-resistant optical image stabilization voice coil motor, which, on the basis of Embodiment 1, further includes a fixing spring plate 8 mechanically connected to the top of the lens carrier 3 and the housing 1. The fixing spring plate 8 may be made of a metal or non-metal material, and is not electrically connected to the coils 5, but is only used for assisting in fixedly connecting the lens carrier 3 to the housing 1.

The above descriptions are merely preferred embodiments of the present invention, and are not intended to limit the protection scope of the present invention. Any modifications, equivalent replacements or improvements made without departing from the spirit and principle of the present invention shall be encompassed in the protection scope of the present invention.

What is claimed is:

1. A magnetic interference-resistant optical image stabilization voice coil motor, comprising a housing, and a plurality of magnets, a lens carrier, a conductive spring plate and coils arranged inside the housing, wherein the plurality of magnets are divided into pairs, and two magnets of each pair have opposite magnetic field directions and are arranged side by side vertically; the coils are formed by winding a conductive wire, and each of the coils has a first wire end and a second wire end, wherein the magnetic interference-resistant optical image stabilization voice coil motor comprises one conductive spring plate, at least three said pairs of magnets and at least three coils, wherein the at least three pairs of magnets are all fixed on an inner wall of the housing, the at least three coils are all mounted on an outer wall of the lens carrier, and each of the coils is disposed opposite to one pair of magnets; and the conductive spring plate is mechanically fixedly connected to the bottom of the lens carrier and the housing or the bottom of a lower row of magnets, the conductive spring plate is provided with at least three conductive paths, each of the conductive paths corresponds to one coil and has an input end and a common end adjacent to and separated from each other, and the first wire end and the second wire end of each of the coils are respectively connected to the input end and the common end of the corresponding conductive path.

2. The magnetic interference-resistant optical image stabilization voice coil motor according to claim 1, wherein the input ends of the conductive paths are unconnected to each other, and the common ends are not connected to each other or at least two of the common ends are electrically connected to each other.

3. The magnetic interference-resistant optical image stabilization voice coil motor according to claim 1, wherein the optical image stabilization voice coil motor further comprises a base, the base is provided thereon with a conductive portion for electrically connecting to the outside, the conductive portion is exposed out of a surface of the base, and the coil is electrically connected to the conductive portion.

4. The magnetic interference-resistant optical image stabilization voice coil motor according to claim 3, wherein the housing covers the base, the base is provided thereon with an engaging column extending upwards, a slot is formed on the outer wall of the lens carrier, a through hole is formed on a periphery of the conductive spring plate, and the engaging column is engaged in the slot through the through hole.

5. The magnetic interference-resistant optical image stabilization voice coil motor according to claim 4, wherein the optical image stabilization voice coil motor further comprises a press ring, the press ring is sandwiched between the conductive spring plate and the base, and a top surface of the press ring is fixedly connected to the conductive spring plate.

6. The magnetic interference-resistant optical image stabilization voice coil motor according to claim 1, wherein a boss is provided on the outer wall of the lens carrier, and the coil is wound around a periphery of the boss.

7. The magnetic interference-resistant optical image stabilization voice coil motor according to claim 1, wherein the lens carrier is further provided with winding columns extending from the bottom thereof, the first and second wire ends of the coil are wound on two different winding columns, and the conductive spring plate is provided with yielding holes at positions corresponding to the winding columns.

8. The magnetic interference-resistant optical image stabilization voice coil motor according to claim 1, wherein the housing has a rectangular cross-section, the magnetic interference-resistant optical image stabilization voice coil motor comprises four pairs of magnets and four coils, and the four pairs of magnets are respectively located at four corners inside the housing.

9. The magnetic interference-resistant optical image stabilization voice coil motor according to claim 1, wherein the optical image stabilization voice coil motor further comprises a fixing spring plate mechanically connected to the top of the lens carrier and the housing.

10. A method of manufacturing the magnetic interference-resistant optical image stabilization voice coil motor according to claim 1, comprising the following steps:

A. winding the conductive wire into a coil by using an automatic coil winding machine, and mounting the coil onto the lens carrier;
B. placing the conductive spring plate below the lens carrier, and mechanically connecting the conductive spring plate to the lens carrier;
C. electrically connecting the input ends and the common ends of the conductive paths on the conductive spring plate to the first and second wire ends of the coils respectively;
D. fixing magnets to the inner wall of the housing, and disposing the lens carrier inside the housing in such a manner that each of the coils is opposite to one pair of magnets; and
E. mechanically connecting the magnets and the conductive spring plate.

* * * * *